United States Patent

Shafir

[11] Patent Number: 5,804,830
[45] Date of Patent: Sep. 8, 1998

[54] THREE-DIMENSIONAL NON-CONTACT SCANNING APPARATUS AND METHOD USING AT LEAST ONE CIRCULAR, PLANAR ARRAY OF A PLURALITY OF RADIANT ENERGY SENSORS, AND A ROTATING ENERGY SOURCE

[75] Inventor: Aaron Shafir, Tel Aviv, Israel

[73] Assignee: Shafir Production System Ltd., Tel Aviv, Israel

[21] Appl. No.: 521,321

[22] Filed: Aug. 30, 1995

[51] Int. Cl.⁶ .................................................. G02B 26/08
[52] U.S. Cl. ............... 250/559.22; 250/224; 250/559.23; 250/559.12; 356/376; 364/354
[58] Field of Search .................. 250/559.23, 559.22, 250/559.12, 234, 224; 356/376, 380; 364/564

[56] References Cited

U.S. PATENT DOCUMENTS

| | | | |
|---|---|---|---|
| 3,588,480 | 6/1971 | Unger et al. ............................. | 250/224 |
| 4,302,097 | 11/1981 | Chlestil .................................... | 356/376 |
| 4,679,076 | 7/1987 | Vikterloff et al. ....................... | 356/376 |
| 4,745,290 | 5/1988 | Frankel et al. ...................... | 250/559.17 |
| 5,103,338 | 4/1992 | Crowley et al. ......................... | 359/394 |
| 5,128,880 | 7/1992 | White ...................................... | 356/376 |
| 5,371,375 | 12/1994 | Stern et al. .............................. | 356/376 |
| 5,477,371 | 12/1995 | Shafir ...................................... | 356/376 |

FOREIGN PATENT DOCUMENTS

| | | | |
|---|---|---|---|
| 60-0055210 | 3/1985 | Japan ...................................... | 356/376 |
| 60-0055211 | 3/1985 | Japan ...................................... | 356/376 |
| 0054208 | 3/1989 | Japan ...................................... | 356/376 |

*Primary Examiner*—Stephone Allen
*Attorney, Agent, or Firm*—Ladas & Parry

[57] ABSTRACT

A method of scanning and mapping the outer contour of a three-dimensional object, for example a person's foot, by locating a plurality of radiant-energy sensors in a circular array around the object, rotating a transmitter about the object to transmit radiant energy to the sensors of the circular array except those shadowed by the object, and utilizing detected changes in state of the sensors, and the instantaneous positions of the transmitter when a change in state is detected, for mapping the outer contour of the object.

20 Claims, 10 Drawing Sheets

THREE-DIMENSIONAL NON-CONTACT SCANNING APPARATUS AND METHOD USING AT LEAST ONE CIRCULAR, PLANAR ARRAY OF A PLURALITY OF RADIANT ENERGY SENSORS, AND A ROTATING ENERGY SOURCE

FIELD AND BACKGROUND OF THE INVENTION

The present invention relates to a three-dimensional, non-contact scanning apparatus and method. The invention is particularly useful for scanning and mapping the outer contour of a subject's foot, and is therefore described below with respect to this application, but it will be appreciated that the invention could also be used in other applications.

In the footwear industry there is a demand for equipment that can scan the outer contour of a subject's foot and to input such information into a computer. Once in the computer, the information can be utilized in many ways, e.g., for selecting the appropriate shoe size in a shoe store. One technique for scanning the outer contour of an object, such as a subject's foot, is by moving a contact probe around the object. This method, however, is relatively slow for many potential applications of the method.

My patent application Ser. No. 08/165,616, filed Dec. 13, 1993 which application is still pending, discloses a non-contact scanning apparatus and method including an optical beam scanner, e.g., a laser scanner, capable of operating much faster than the contact probe type scanning apparatus. While such a scanner permits very fast scanning, it is quite expensive and therefore not feasible in many possible applications, such as in shoe stores, where low cost is a critical requirement.

OBJECTS AND BRIEF SUMMARY OF THE INVENTION

An object of the present invention is to provide a scanning method and apparatus of the general type described in the above-cited patent application Ser. No. 08/165,616, but which may be implemented at relatively low cost.

According to one aspect of the present invention, there is provided a method of scanning and mapping the outer contour of a three-dimensional object, comprising: locating a plurality of radiant-energy sensors, sensitive to predetermined radiant energy, in at least one circular, planar array around the longitudinal axis of the object; rotating a radiant energy transmitter about the longitudinal axis of the object to transmit the predetermined radiant energy along a transverse slice of the object to the sensors of the circular array except those shadowed by the object; and utilizing the information generated by said transmitter and sensors for mapping the outer contour of the respective slice of the object.

More particularly, according to further features in the preferred embodiment of the invention described below, the sensors are of a type which assume a first state when the predetermined radiant energy is sensed thereby and a second state when the predetermined radiant energy is not sensed thereby; in addition, the information generated by the transmitters and sensors is utilized to map the outer contour of the respective slice of the object by: detecting a change in state in any of the sensors of the circular array; determining the instantaneous position of the transmitter when a change in state is detected in any of the sensors of the circular array; and utilizing the detected changes in state of the sensors and the determined instantaneous positions of the transmitter for scanning and mapping the outer contour of the respective slice of the object.

In the preferred embodiment of the invention described herein, the sensors are optical, preferably infrared, sensors, and the transmitter is an optical, preferably infrared transmitter. It has been found that this preferred method can be implemented in apparatus of relatively low cost capable of providing fast and accurate scanning and mapping of the outer contour of a three-dimensional object such as a person's foot.

The scanning time can be even further reduced by arranging the plurality of sensors in a plurality of circular, planar arrays aligned with each other in the direction of the longitudinal axis of the object being scanned; and by providing a plurality of transmitters arranged in a linear array also parallel to the longitudinal axis of the object being scanned. The transmitters in the linear array are sequentially energized, and the sensors in each linear array are sequentially enabled in synchronism with the sequential energization of the transmitters, whereby a plurality of slices of the object may be simultaneously scanned and mapped.

While the invention is particularly useful for mapping a person's foot, it will be appreciated that it could also be used for mapping other three-dimensional objects, e.g., the outer shape of a person's body for producing custom-fit clothing, the outer shape of a three-dimensional model to be reproduced, etc.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
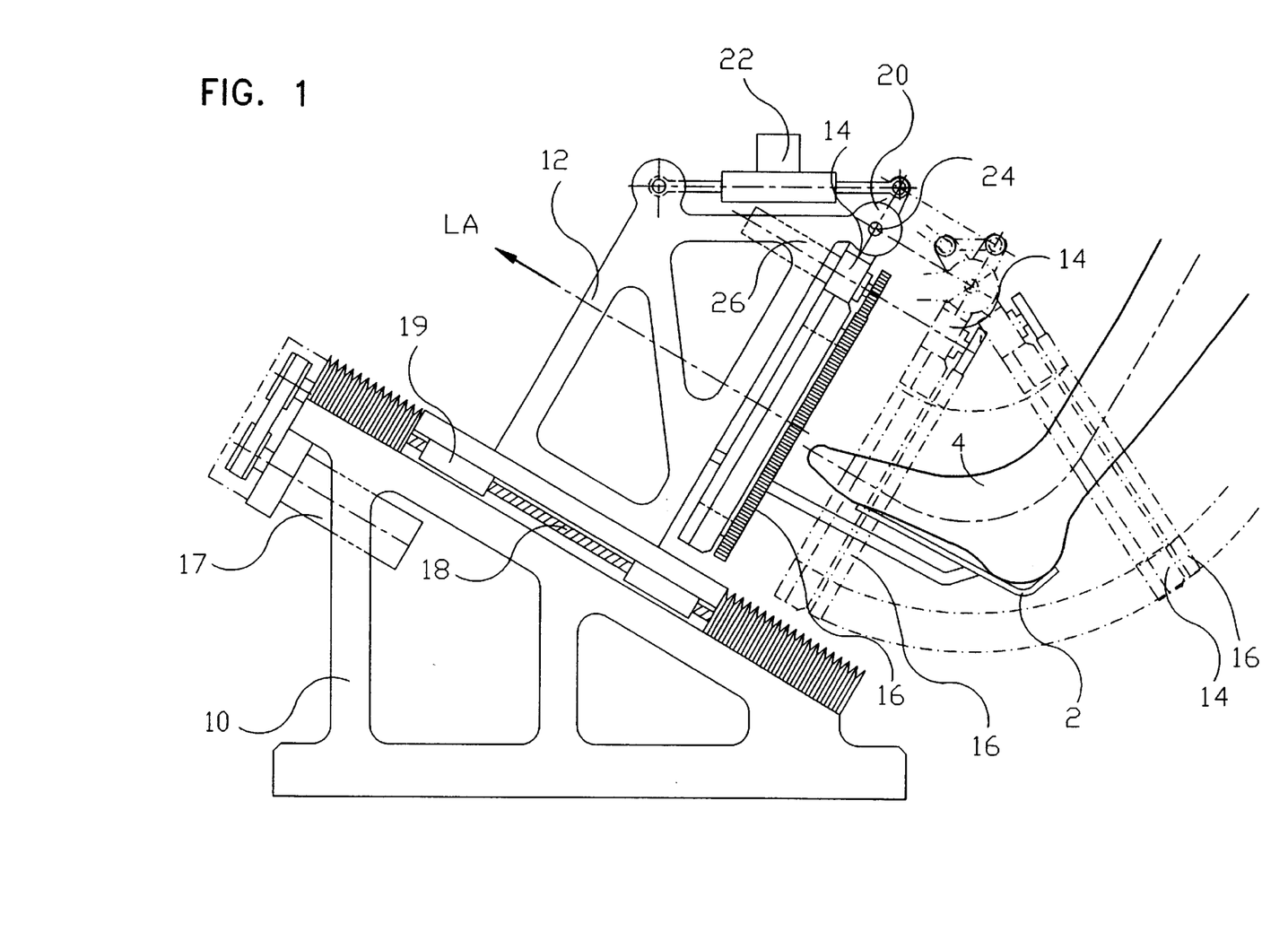
FIG. 1 is a side elevational view illustrating one form of apparatus constructed in accordance with the present invention.

The apparatus illustrated in FIG. 1 is particularly useful for the non-contact scanning of a subject's foot in order to map its outer contour and to produce three-dimensional digital data to be inputted into a computer for further processing, recording, and/or display.

The apparatus illustrated in FIG. 1 includes a holder 2 for holding the object to be scanned, in this case a footrest for receiving the subject's foot 4 to be scanned and digitized. The illustrated apparatus further includes a base 10 supporting a main carriage 12, an intermediate carriage 14, and a rotary carriage 16. A linear actuator, including a motor 17 driving a screw 18 within a pair of nuts 19 fixed to the main carriage 12, moves the main carriage towards and away from the footrest 2, and parallel to the longitudinal axis LA of the foot defined by its longest dimension.

The intermediate carriage 14, is in the form of a ring having an inner diameter large enough to enclose the footrest 2 and the foot thereon. It is pivotally mounted at its upper end to the main carriage 12 by a pivotal mounting 20, and is pivoted by a linear actuator 22 about pivot point 24.

Figure 3:
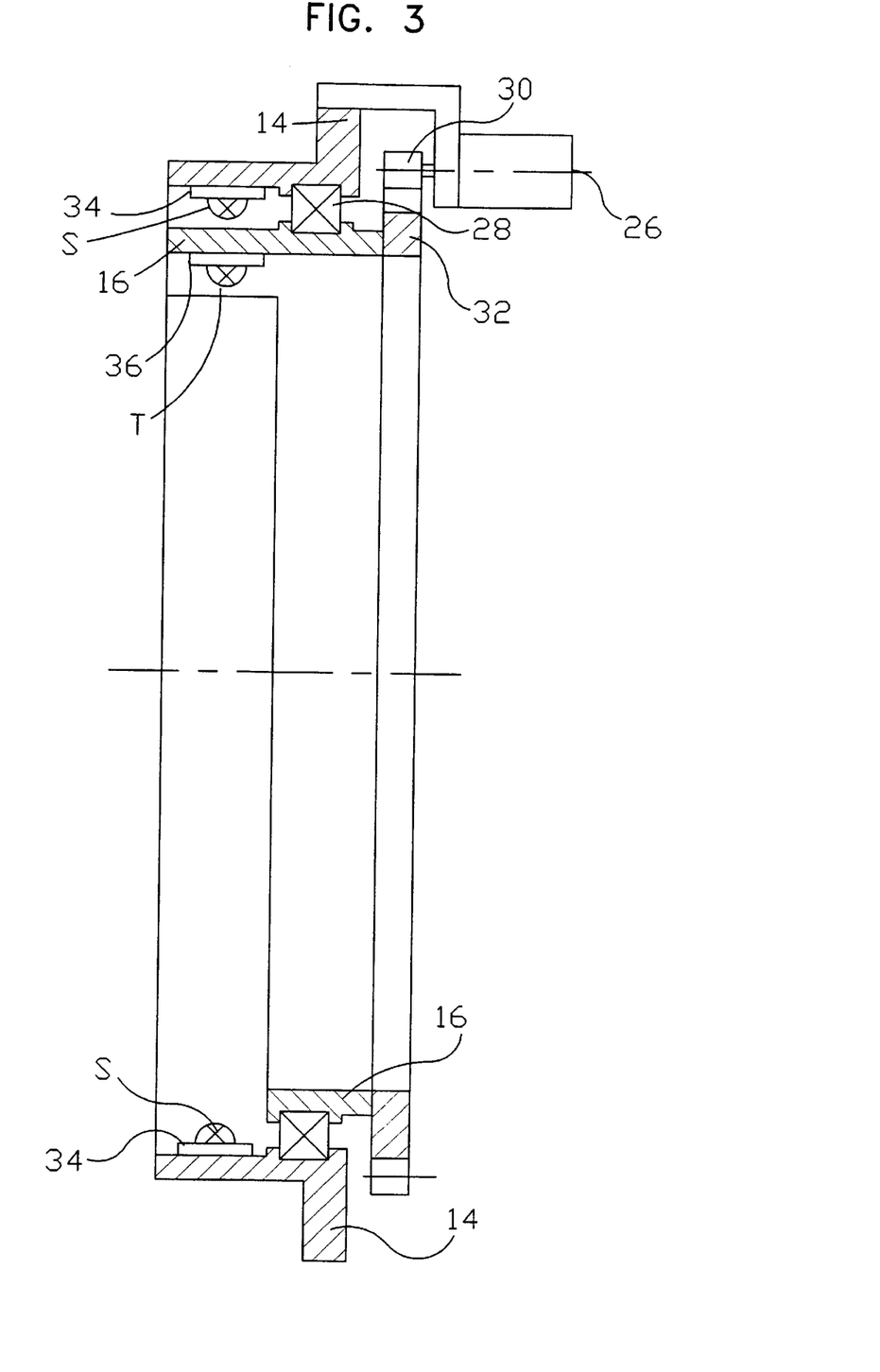
FIG. 3 is an enlarged sectional view along line III—III of FIG. 2.

Rotatable carriage 16 is also in the form of a ring to enclose the footrest 2 and the subject's foot 4 thereon. It is coaxial with intermediate carriage 14 and is rotatable with respect to that carriage by a drive motor 26 carried by the intermediate carriage 14. As shown in FIG. 3, a rotary bearing 28 is interposed between intermediate carriage 14 and rotary carriage 16. Carriage 16 is rotated by motor 26 via a pinion 30 meshing with a gear wheel 32 carried by the rotary carriage.

Intermediate carriage 14 carries a plurality of radiant energy sensors S mounted on boards 34 arranged in a circular array equally spaced around the circumference of the intermediate carriage 14. Rotary carriage 16 carries a radiant-energy transmitter T mounted on a board 36 in substantially the same transverse plane as that of the sensors S. As carriage 16 is rotated, transmitter T is rotated therewith around the circumference of the subject's foot 4 on the footrest 2 to scan the outer surface of a transverse slice of the subject's foot and to transmit the radiation to the circular array of sensors S except those shadowed by the subject's foot.

Transmitter T transmits optical radiation, more particularly, infrared radiation; and sensors S are sensitive to such infrared radiation. The sensors S are bi-state devices. That is they assume a first state (e.g., conductive) when sensing infrared radiation, and a second state (e.g., non-conductive) when not sensing infrared radiation. Preferably, each transmitter T is a light-emitting diode (LED) transmitting infrared radiation; and each sensor S is an infrared sensor, such as the Siemens SFH 225.

Figure 2:
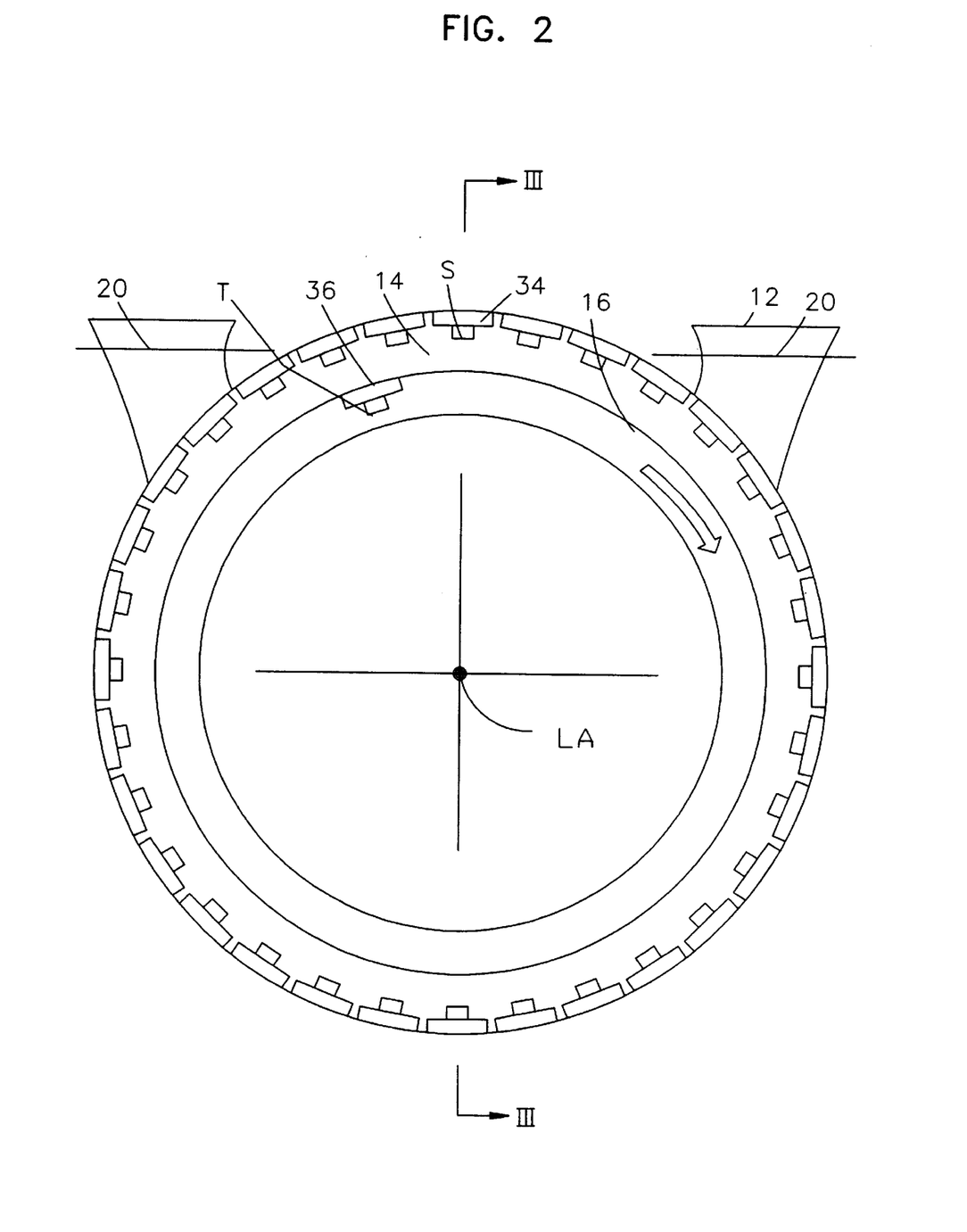
FIG. 2 is a front view of the intermediate carriage and rotatable carriage in the apparatus of FIG. 1.

FIGS. 2 and 3 illustrate a circular array of sensors S and a single transmitter T all occupying a single plane for scanning the outer surface of a single slice of the subject's foot with each rotation of the rotary carriage 16. Preferably, however, the apparatus would include a plurality of planar arrays of sensors S and transmitters T extending in side-by-side relation along the longitudinal axis LA of the footrest to enable the apparatus to simultaneously scan the outer surface of a plurality of slices of the subject's foot with each rotation of the rotary carriage 16.

Figure 4:
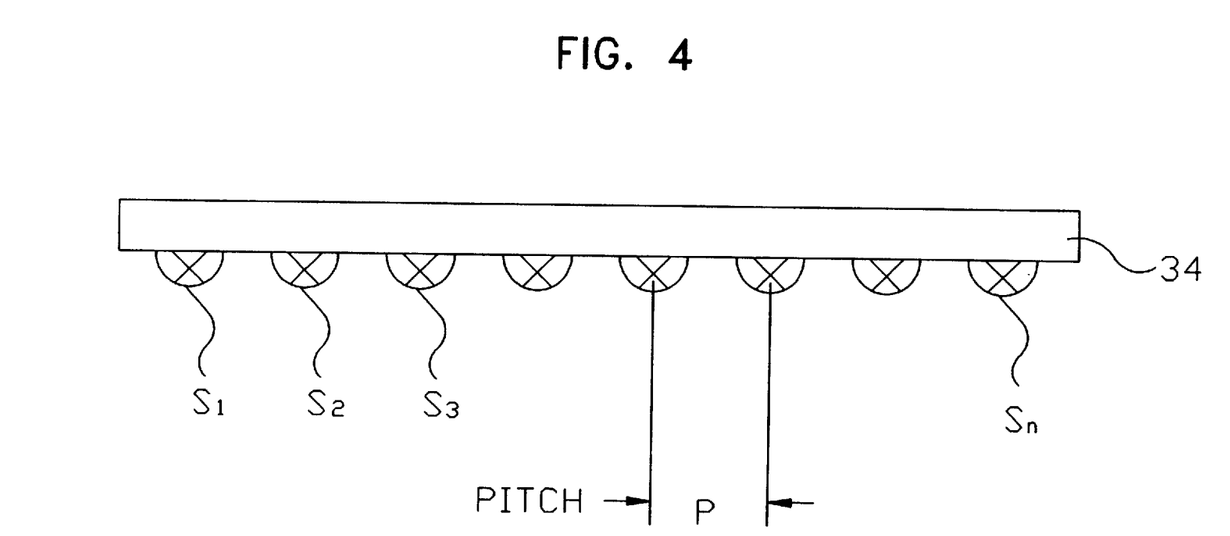
FIG. 4 illustrates one line of sensors, in an arrangement including a plurality of lines of sensors arranged in a circular array, that may be provided to enable the simultaneous scanning of the outer contour of a plurality of slices of the object.
Figure 6:
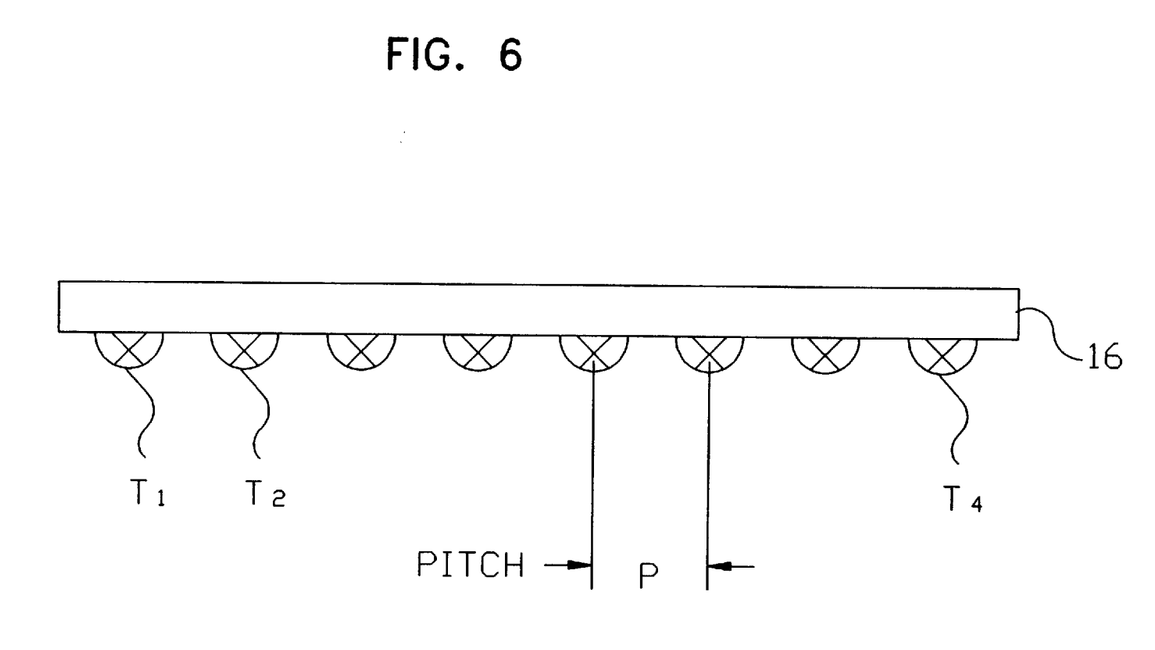
FIG. 6 illustrates a linear arrangement of transmitters that may be provided to enable scanning a plurality of slices simultaneously.

The multiple-slice scanning arrangement is more particularly shown in FIGS. 4 and 6. FIG. 4 illustrates a plurality of sensors $S_1$–$S_n$ mounted on each board 34 of the circular array carried by the intermediate carriage 14 and extending parallel to the footrest longitudinal axis LA; whereas FIG. 6 illustrates a plurality of transmitters $T_1$–$T_n$ mounted on board 36 carried by the rotary carriage 16 and also extending parallel to the footrest longitudinal axis LA. As also seen in FIGS. 4 and 6, the spacing pitch P of the sensors $S_1$–$S_n$ is equal to the spacing pitch "p" of the transmitters $P_1$–$P_n$, so that each transmitter $T_1$–$T_n$ would occupy the same plane as one of the "n" circular arrays of sensors $S_1$–$S_n$.

In the example illustrated in the drawings, the intermediate carriage 14, which is stationary relative to the rotary carriage 16, includes 32 groups of sensors S arranged in a eight circular arrays around the footrest longitudinal axis LA; i.e., each group includes eight sensors arranged linearly parallel to the longitudinal axis LA. The rotary carriage 16, on the other hand, carries a single group of eight transmitters T arranged linearly parallel to the longitudinal axis LA, and rotated with carriage 16 about the longitudinal axis LA. Such an arrangement permits the apparatus to scan the outer surface of eight slices of the subject's foot 4 on footrest 2 with each rotation of the rotary carriage 16.

Figure 5:
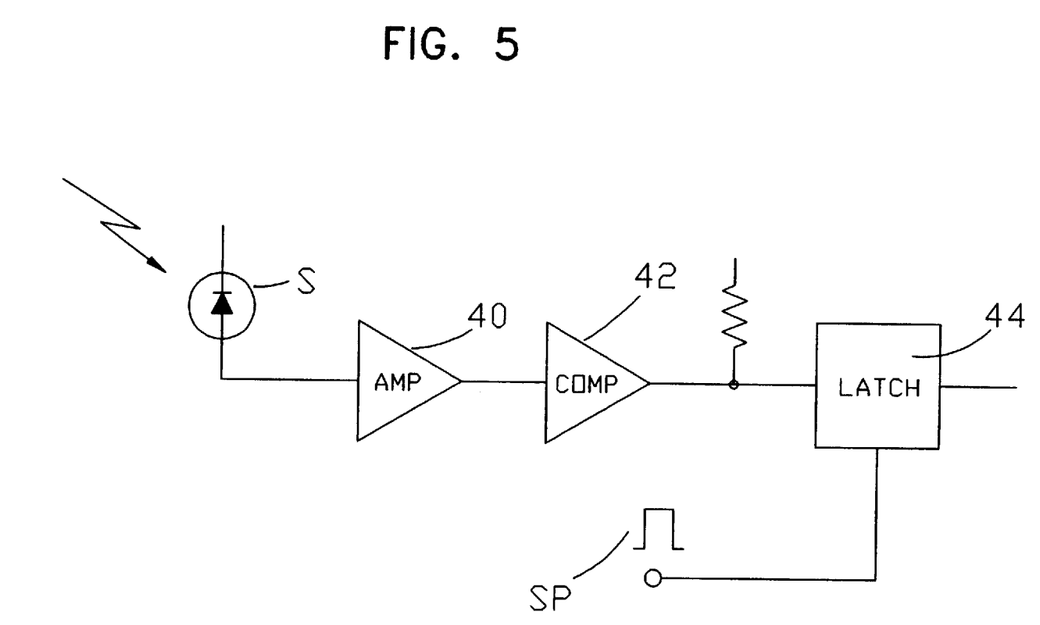
FIG. 5 illustrates the electronic circuit for each of the sensors in FIG. 4.
Figure 7:
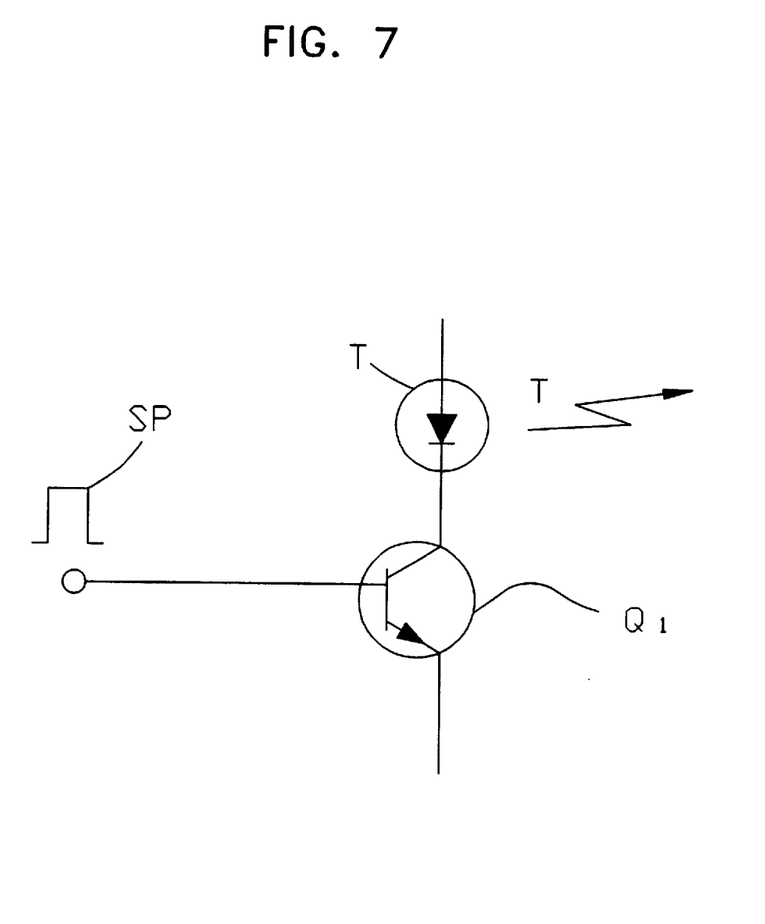
FIG. 7 illustrates the electronic circuit for each transmitter in FIG. 6.

During the operation of the apparatus, the transmitters $T_1$–$T_n$ in the linear array (FIG. 6) are sequentially energized; and the sensors $S_1$–$S_n$ (FIG. 4) in each circular array are sequentially enabled in synchronism with the sequential energization of the transmitters T. FIG. 7 illustrates the electrical circuit to each transmitter T, wherein it will be seen that each transmitter includes a switching transistor $Q_1$ controlled by sync pulses SP. FIG. 5 illustrates the electrical circuitry from each sensor S, wherein it will be seen that the output of each sensor is fed, via an amplifier 40 and comparator 42, to a latch circuit 44 controlled by the same sync pulses SP.

Figure 8:
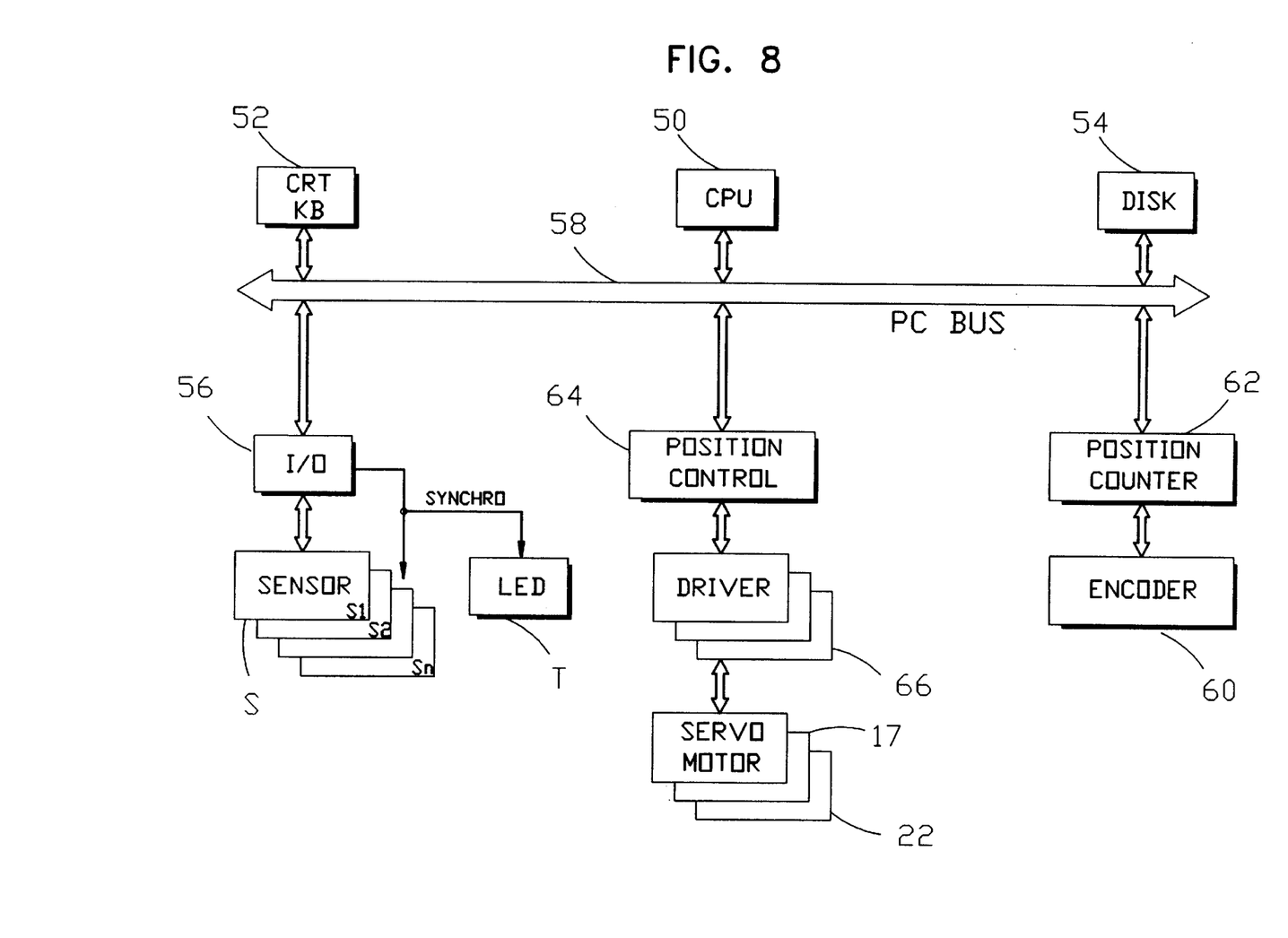
FIG. 8 is a block diagram illustrating the overall system.

The electrical system for controlling the apparatus is shown in the block diagram of FIG. 8. It includes a standard PC computer having a CPU (Central Processing Unit) 50, input and output devices schematically indicated by block 52 as including a keyboard input and a CRT display output, and a hard disc memory indicated by block 54. The sensors S and transmitters T communicate with the CPU 50 via input/output circuitry 56 and a PC bus 58. As described above particularly with respect to FIGS. 5 and 7, the operation of the sensors S is synchronized with the operation of the transmitters T. The instantaneous position of the transmitters T on the rotatable carriage 16 is continuously monitored by an encoder 60 and a position counter 62 connected to the PC bus 58. Servo motors 17, 22 are controlled via a position controller 64 and driver circuits 66.

The overall operation of the apparatus will now be described particularly with reference to the flow chart of FIG. 9 and the diagram of FIG. 10.

The subject's foot to be scanned and mapped is placed on footrest 2. The main carriage 12 is then advanced by linear actuator 18 (FIG. 1) until the intermediate carriage 14, and the rotary carriage 16 carried by the intermediate carriage, enclose the front part of the subject's foot preparatory to scanning its outer contour by the transmitters T carried by the rotary carriage 14. Since the described apparatus includes eight transmitters $T_1$–$T_n$ carried by the rotary carriage 16, and eight sensors $S_1$–$S_n$ in each of the 32 circular arrays of sensors carried by the intermediate carriage 14, each rotation of carriage 16 will simultaneously scan eight slices of the outer surface of the subject's foot 4. FIGS. 9 and 10 illustrate the operation for each slice.

Thus, as carriage 16 is rotated to rotate the transmitters T (block 70, FIG. 9), each of the transmitters $T_1$–$T_n$, when energized, transmits its radiation towards the object such that all the sensors will receive the radiation except those shadowed by the foot 4. Since the transmitters $T_1$–$T_n$ are sequentially energized by the sync pulses SP (FIG. 7), and the sensors $S_1$–$S_n$ in each of the 32 circular arrays are sequentially enabled by the sync pulses SP (FIG. 5) in synchronism with the sequential energization of the transmitters, each sensor will be capable of sensing the infrared radiation only of the transmitter in the respective one of the eight slices.

As one example, the transmitters $T_1$–$T_n$ in the linear array may be sequentially energized at five microsecond intervals by pulses having a duration of two microseconds and spaced from each other 100 microseconds. Also in this example, the rotary carriage 16 may be rotated to complete a single rotation each second.

Figure 9:
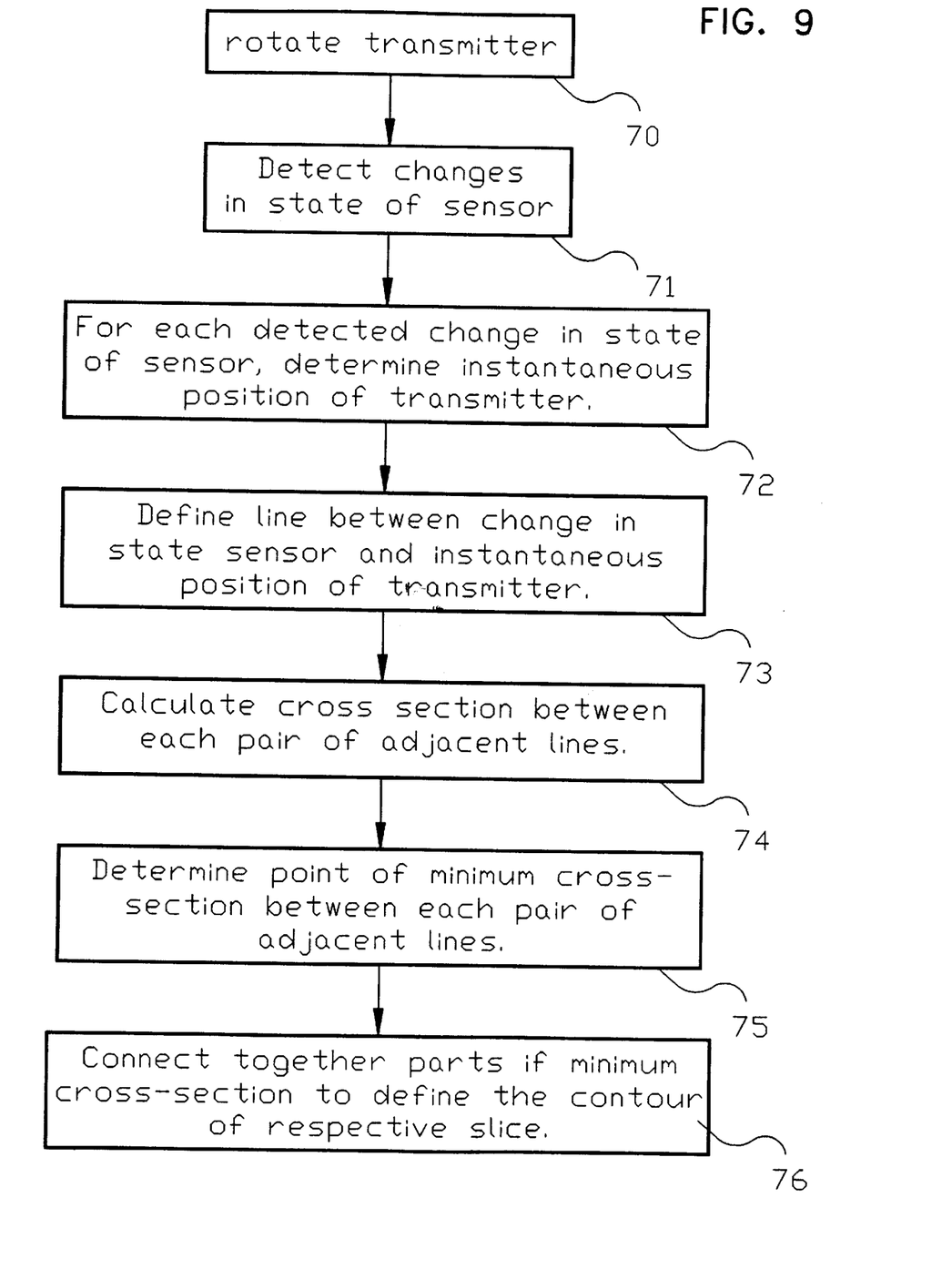
FIG. 9 is a flow chart illustrating the operation of the system.

During the rotation of carriage 16, only the change in state of the sensors $S_1$–$S_n$ are detected (block 71, FIG. 9). For each detected change in state of a sensor, a determination is made of the instantaneous position of the transmitter $T_1$–$T_n$ in the respective slice (block 72). These points are stored in memory. The processor subsequentially defines a line between each point representing the sensor whose state has changed, and the point representing the respective instantaneous position of the transmitter (block 73), and calculates the cross-section between each pair of adjacent lines (block 74). The processor then determines the point of minimum cross-section between each pair of adjacent lines (block 75), and connects together these points of minimum cross-section to define the contour of the respective slice (block 76).

Figure 10:
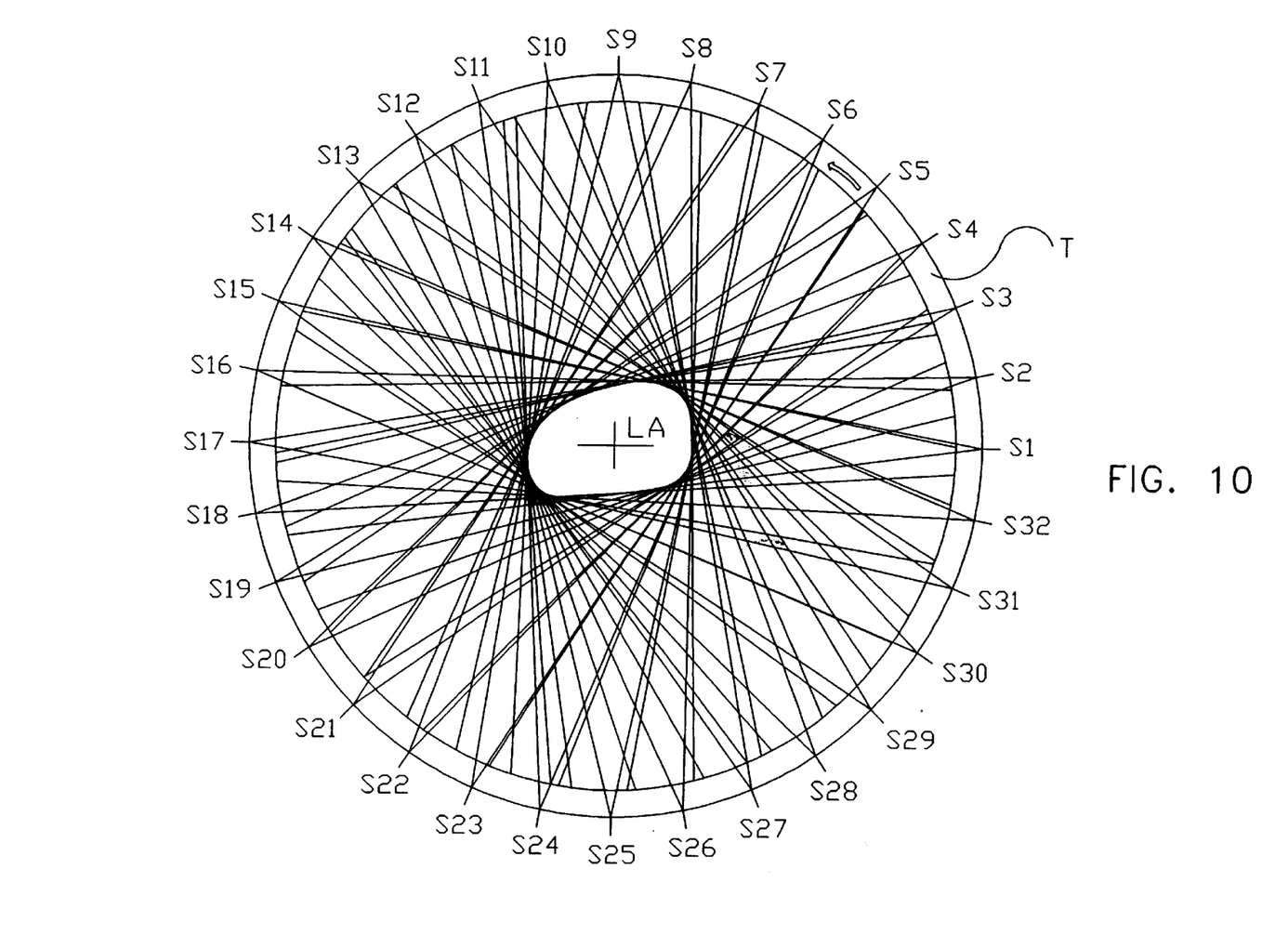
FIG. 10 is a diagram illustrating the manner in which the processor operates according to the flow chart of FIG. 9 in order to utilize the information generated during the scanning operation for mapping the outer contour of a slice of the object being scanned.

The foregoing operations are shown in the diagram of FIG. 10, wherein it will be seen that 32 points of minimum cross-section are defined one for each of the 32 sensors in the circular array of the respective slice. These 32 points are connected together to define the outer contour of the respective slice of the subject's foot.

The subject's foot may be scanned and mapped in the foregoing manner in two stages, each including a plurality of steps. For example, in the first stage, the front part of the subject's foot may be scanned in three steps to provide 24 slices. For the second stage, the intermediate carriage 14, including the rotary carriage 16, may be pivoted to enable the rear part of the subject's foot, including the heel and the ankle, to be scanned in three additional steps so as to map the outer contour for an additional 24 slices. If each rotation of carriage 16 takes one second, the scanning and mapping of the complete foot, requiring six rotations (each including eight slices), would take in the order of six seconds.

While the invention has been described with respect to one preferred embodiment, it will be appreciated that this is set forth merely for purposes of example, and that many variations and other applications of the invention may be made. For example, each rotation of the rotary carriage could scan and map a larger or smaller number of slices. In addition, the described method and apparatus could be used for scanning and mapping other three-dimensional objects, such as a person's body for preparing tailor-fitted wearing apparel, for three-dimensional models to be duplicated, and the like. Many other variations, modifications and applications of the invention will be apparent.

I claim:

1. A method of scanning and mapping the outer contour of a three-dimensional object, comprising:

locating a plurality of radiant-energy sensors, sensitive to predetermined radiant energy, in at least one circular, planar array around the longitudinal axis of the object;

rotating a radiant energy transmitter about the longitudinal axis of the object to transmit said predetermined radiant energy along a transverse slice of said object to said sensors of the circular array except those shadowed by said object;

and utilizing information generated by said transmitter and sensors for mapping the outer contour of the respective slice of said object.

2. The method according to claim 1, wherein each sensor assumes a first state when said predetermined radiant energy is sensed thereby, and a second state when said predetermined radiant energy is not sensed thereby;

and wherein said information generated by the sensors and transmitters are utilized for mapping the outer contour of the respective slice of said object by detecting a change in state in any of said sensors of the circular array as said transmitter is rotated;

determining the instantaneous position of the transmitter when a change in state is detected in any of said sensors of the circular array;

and utilizing said detected changes in state of the sensors and said determined instantaneous positions of said transmitter for mapping the outer contour of the respective slice of said object.

3. The method according to claim 2, wherein said sensors are optical sensors and said transmitter is an optical transmitter.

4. The method according to claim 3, wherein said sensors are infrared sensors and said transmitter is an infrared transmitter.

5. The method according to claim 2, wherein said detected changes in state of the sensors, and said determined instantaneous positions of said transmitter, are utilized for mapping the outer contour of the respective slice of said object by:

defining a line between each sensor in which a change in state is detected and the respective instantaneous position of the transmitter;

calculating the cross-section between each pair of adjacent lines;

determining the point of minimum cross-section between each pair of adjacent lines;

and connecting together said points of minimum cross-section between each pair of adjacent lines to define the outer contour of the respective slice of the object.

6. The method according to claim 2, wherein said plurality of sensors are arranged in a plurality of circular, planar arrays aligned with each other in the direction of the longitudinal axis of the object being scanned;

and wherein there are a plurality of transmitters arranged in a linear array parallel to the longitudinal axis of the object being scanned, which transmitters are rotated together about the longitudinal axis of the object being scanned;

thereby enabling the outer contour of a plurality of slices of the object to be scanned and mapped during each rotation of said plurality of transmitters.

7. The method according to claim 6, wherein said transmitters in the linear array are sequentially energized, and said sensors in the plurality of circular arrays are sequentially enabled in synchronism with the sequential energization of said transmitters.

8. The method according to claim 2, wherein said plurality of sensors are disposed on a circular carriage enclosing the object, and said transmitter is disposed on a rotatable carriage rotatably mounted on said circular carriage.

9. The method according to claim 8, wherein the object is a subject's foot, and wherein the circular carriage is first moved parallel to the long dimension of the subject's foot to scan and map the front part thereof, and is then pivoted about a horizontal axis to scan and map the rear part and heel of the subject's foot.

10. Apparatus for scanning and mapping the outer contour of a three-dimensional object, comprising:

a holder for holding said object;

a plurality of radiant energy sensors sensitive to predetermined radiation disposed in at least one circular, planar array around the longitudinal axis of the object when received on said holder, each sensor assuming a first state when said predetermined radiation is sensed thereby, and a second state when said predetermined radiation is not sensed thereby;

a radiant energy transmitter for transmitting said predetermined radiation;

means for rotating said radiant energy transmitter about the longitudinal axis of said object, when received on said holder, to transmit said predetermined radiation along a transverse slice of said object to said sensors of the circular array except those shadowed by said object;

change-of-state detector means for detecting a change in state in any of said sensors;

position-determining means for determining the instantaneous position of the transmitter when a change in state in any of said sensors is detected;

and processor means for utilizing said detected change in states of the sensors and said instantaneous positions of the transmitter for mapping the outer contour of said object.

11. The apparatus according to claim 10, wherein said sensors are optical sensors, and said transmitter is an optical transmitter.

12. The apparatus according to claim 11, wherein said optical sensors are infrared sensors, and said optical transmitter is an infrared transmitter.

13. The apparatus according to claim 10, wherein said processor means maps the outer contour of each transverse slice of said object by:

defining a line between each sensor in which a change in state is detected and the respective instantaneous position of the transmitter;

calculating the cross-section between each pair of adjacent lines;

determining the point of minimum cross-section between each pair of adjacent lines;

and connecting together said points of minimum cross-section between each pair of adjacent lines to define the outer contour of the respective slice of the object.

14. The apparatus according to claim 10, wherein said plurality of sensors are arranged in a plurality of circular, planar arrays aligned with each other in the direction of the longitudinal axis of the object being scanned, and wherein there are a plurality of radiant energy transmitters arranged in a linear array parallel to the longitudinal axis of the object being scanned.

15. The apparatus according to claim 14, wherein said processor means includes means for sequentially energizing said transmitters in the linear array, and means for sequentially enabling said sensors in each circular array in synchronism with the sequential energization of said transmitters.

16. The apparatus according to claim 10, wherein said plurality of sensors are carried by a main carriage movable linearly towards and away from said holder parallel to the longitudinal axis of the object when held thereon; and wherein said transmitter is carried by a rotatable carriage rotatably mounted on said main carriage.

17. The apparatus according to claim 16, wherein said rotatable carriage is in the form of a ring rotatably mounted with respect to said main carriage to enclose said holder and the object when held thereon.

18. The apparatus according to claim 17, wherein said main carriage includes an intermediate carriage pivotally mounting said rotatable carriage to said main carriage, said plurality of sensors being carried by said intermediate carriage.

19. The apparatus according to claim 18, wherein said intermediate carriage and said rotatable carriage are of the form of coaxial rings each having an inner diameter sufficiently large to enclose said object holder and the object when held thereon.

20. The apparatus according to claim 19, wherein said object holder is a footrest for holding a subject's foot to be scanned; said intermediate carriage being pivotally mounted at its upper end to said main carriage such that: (a) the front part of the subject's foot may be first scanned by the linear movement of said main carriage and the rotational movement of said rotatable carriage; and (b) the rear part of the subject's foot, including the heel, may then be scanned by the pivotal movement of said intermediate carriage and the rotational movement of said rotatable carriage.

* * * * *